US008302991B2

(12) United States Patent
Hong et al.

(10) Patent No.: US 8,302,991 B2
(45) Date of Patent: Nov. 6, 2012

(54) KNEE AIRBAG AND METHOD OF FOLDING THE SAME

(75) Inventors: Ik-pyo Hong, Gangwon-do (KR); Gyeong-won Jeong, Seoul (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/165,249

(22) Filed: Jun. 21, 2011

(65) Prior Publication Data
US 2011/0251039 A1 Oct. 13, 2011

Related U.S. Application Data

(62) Division of application No. 12/062,437, filed on Apr. 3, 2008, now Pat. No. 7,963,550.

(30) Foreign Application Priority Data

Dec. 18, 2007 (KR) .......................... 10-2007-0133520
Dec. 18, 2007 (KR) .......................... 10-2007-0133527

(51) Int. Cl.
*B60R 21/20* (2006.01)
*B60R 21/206* (2006.01)
*B60R 21/237* (2006.01)

(52) U.S. Cl. .................. 280/730.1; 280/728.1; 280/732; 280/743.1; 493/405

(58) Field of Classification Search .............. 280/728.1, 280/730.1, 732, 743.1; 493/405
See application file for complete search history.

(56) References Cited

U.S. PATENT DOCUMENTS

| 5,048,863 | A | 9/1991 | Henseler et al. |
| 5,333,903 | A | 8/1994 | Eyrainer et al. |
| 5,639,118 | A | 6/1997 | Rhule et al. |
| 6,428,042 | B1 | 8/2002 | Fischer et al. |
| 6,547,709 | B1 * | 4/2003 | Dennis ........................ 493/405 |
| 6,685,217 | B2 | 2/2004 | Abe |
| 6,739,622 | B2 * | 5/2004 | Halford et al. ............. 280/743.1 |
| 7,182,365 | B2 * | 2/2007 | Takimoto et al. .......... 280/730.1 |
| 7,370,881 | B2 * | 5/2008 | Takimoto et al. .......... 280/730.1 |
| 7,384,065 | B2 * | 6/2008 | Takimoto et al. ............. 280/732 |

(Continued)

FOREIGN PATENT DOCUMENTS

JP 2003-226218 8/2003

(Continued)

OTHER PUBLICATIONS

Machine Translation of JP 2003-226218, Published Aug. 12, 2003, Kazuhiro Abe, 9 pages.

*Primary Examiner* — Ruth Ilan
*Assistant Examiner* — James English
(74) *Attorney, Agent, or Firm* — Brinks Hofer Gilson & Lione

(57) ABSTRACT

A method of folding a knee airbag. One side surface of the airbag is roll-folded toward the centerline defined by the airbag and the other the side surface is thereafter roll-folded toward the centerline. After the steps of roll-folding both of the side surfaces, the knee airbag is vertical roll-fold from an end toward a connection part. With the roll-folding of the side surfaces, the side surfaces are roll folded such that they form different inclination angles with respect to the centerline of the airbag.

6 Claims, 18 Drawing Sheets

U.S. PATENT DOCUMENTS

| | | | |
|---|---|---|---|
| 7,434,837 B2 | 10/2008 | Hotta et al. | |
| 7,954,845 B2 * | 6/2011 | Moritani | 280/730.1 |
| 2003/0030255 A1 | 2/2003 | Igawa et al. | |
| 2003/0193174 A1 | 10/2003 | Abe | |
| 2004/0164527 A1 * | 8/2004 | Nagata et al. | 280/730.1 |
| 2005/0151351 A1 | 7/2005 | Enders et al. | |
| 2006/0055156 A1 * | 3/2006 | Okada et al. | 280/731 |
| 2006/0108780 A1 | 5/2006 | Hotta et al. | |
| 2007/0200320 A1 | 8/2007 | Keshavaraj | |
| 2009/0134611 A1 * | 5/2009 | Wigger et al. | 280/730.1 |

FOREIGN PATENT DOCUMENTS

| | | |
|---|---|---|
| KR | 10-2003-0050611 | 6/2003 |
| KR | 10-2005-0093843 | 9/2005 |

* cited by examiner

FIG. 9
S1
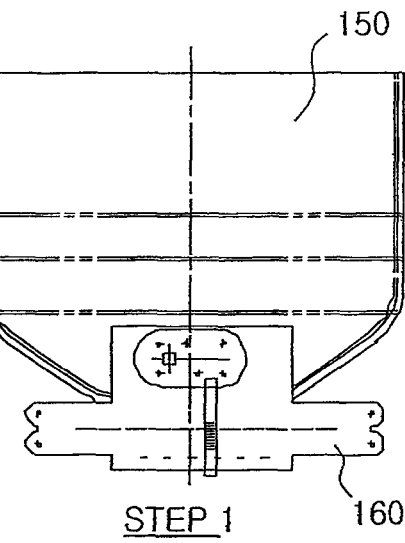
STEP 1
150
160
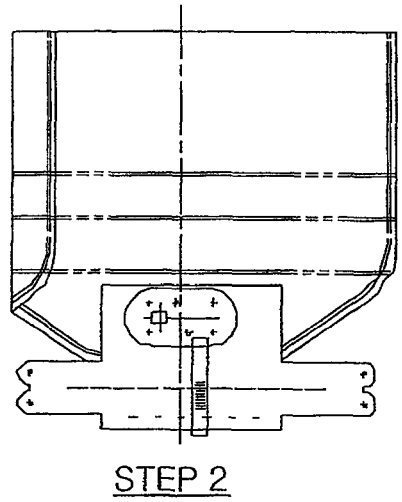
STEP 2
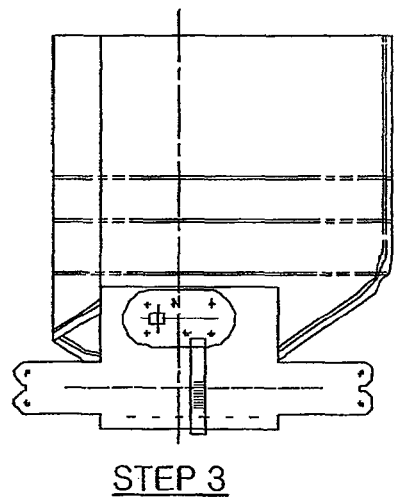
STEP 3
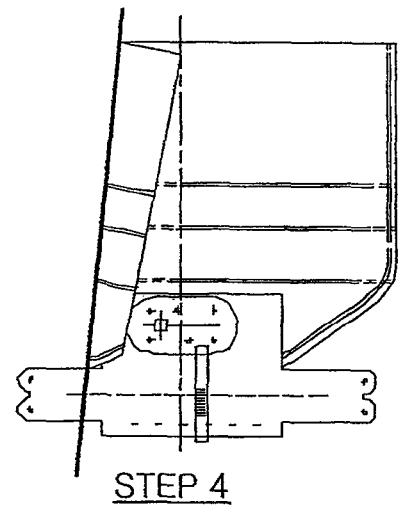
STEP 4
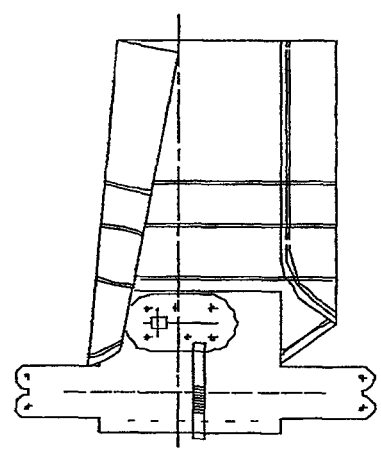
STEP 5
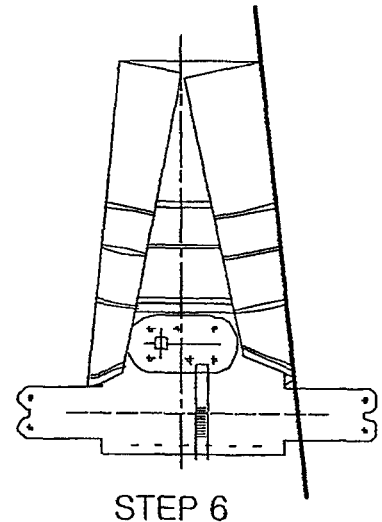
STEP 6

FIG. 10
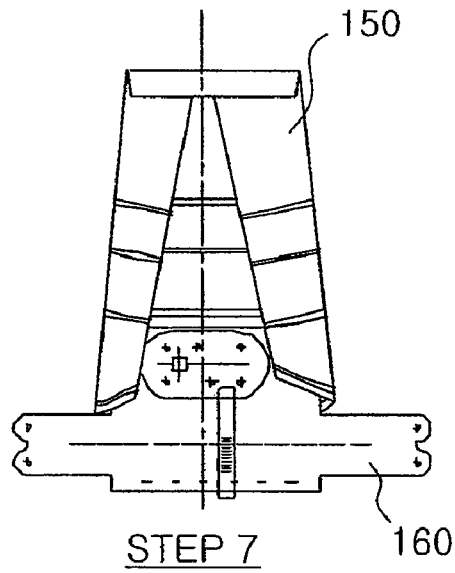
STEP 7
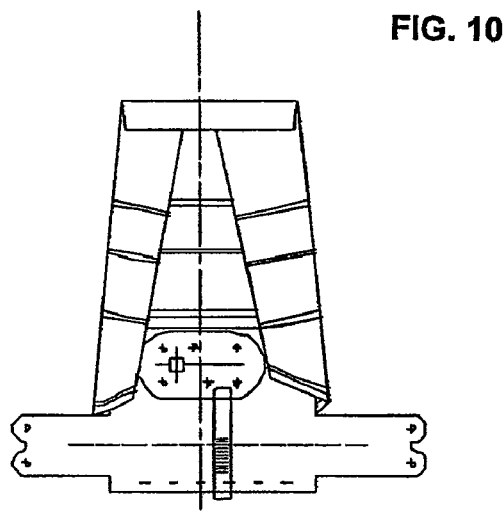
STEP 8
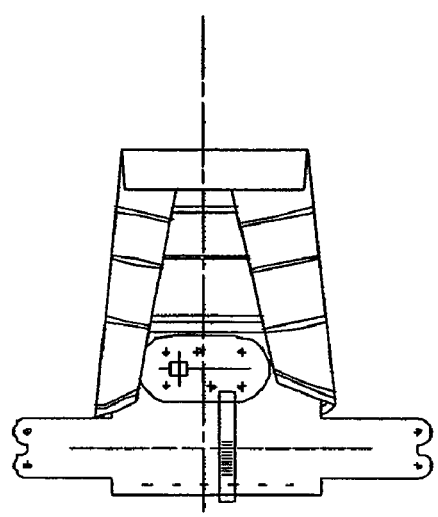
STEP 9
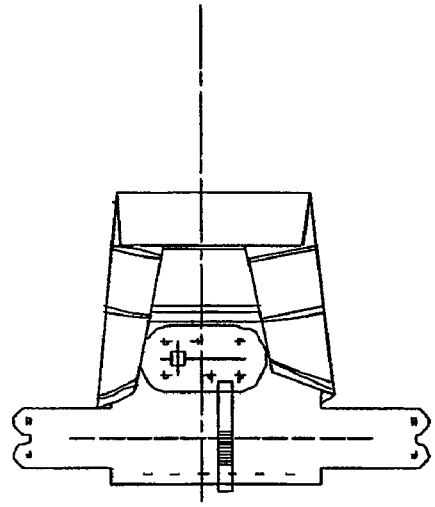
STEP 10
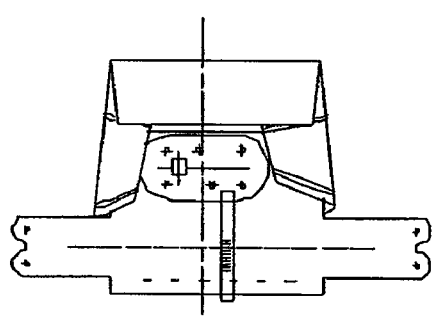
STEP 11

S3
FIG. 11
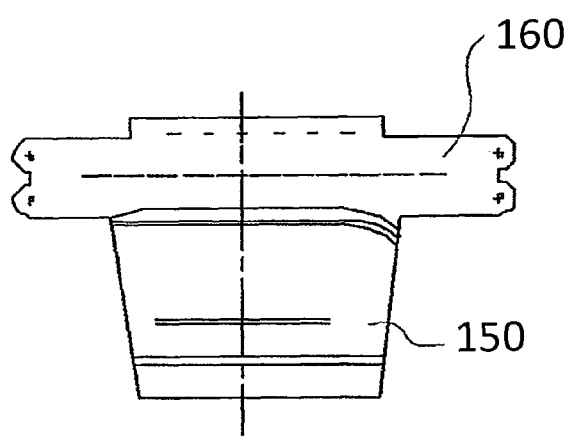
STEP 12
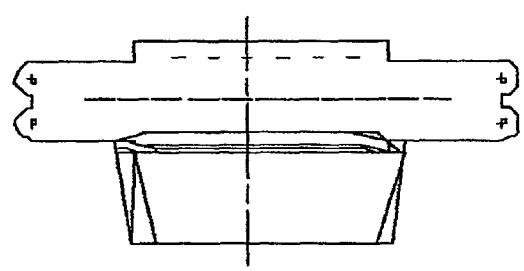
STEP 13
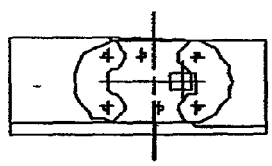
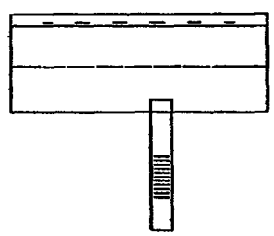
STEP 14

FIG. 14
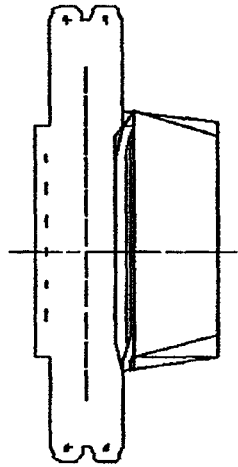
STEP 14
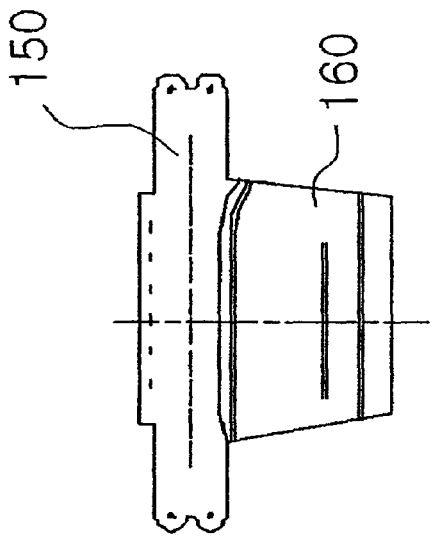
STEP 13
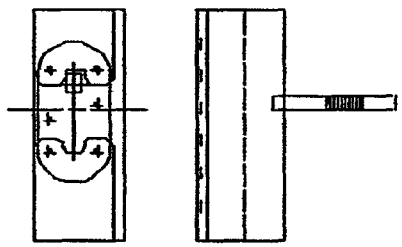
STEP 15

KNEE AIRBAG AND METHOD OF FOLDING THE SAME

CROSS-REFERENCE TO RELATED APPLICATIONS

This application is a divisional application, pursuant to 35 U.S.C. §120, of U.S. patent application Ser. No. 12/062,437, filed Apr. 3, 2008, now U.S. Pat. No. 7,963,550, and claims the benefit of Korean Patent Application Nos. 2007-0133527, filed Dec. 18, 2007 and 2007-0133520, filed Dec. 18, 2007, the disclosures of which are hereby incorporated herein by reference in their entirety.

BACKGROUND

1. Field of the Invention

The present invention relates to a knee airbag and a method of folding the same, and more particularly, to a knee airbag which is installed at a lower crash panel of a vehicle to protect driver's knees or passenger's knees and smoothly deployed without any interference with the lower crash panel during deployment of an airbag, and a method of folding the same.

2. Description of the Related Art

In general, various kinds of safety devices are installed at a vehicle to protect passengers from accidents occurring during running of the vehicle, for example, collision, rear-end collision, rollover, and so on. Such safety devices include a safety belt, an airbag, and so on, which absorbs shock even though the passengers may collide with a vehicle body upon occurrence of an accident.

The airbags are installed at a steering wheel in front of a driver's seat to protect a driver, and installed at an instrument panel in front of a passenger's seat to protect a passenger. In addition, side airbags or curtain airbags are installed to protect passengers on backseats.

In particular, a knee airbag for protecting driver's knees or passenger's knees is installed at a cowl bracket under a steering wheel or installed under an instrument panel.

An example of such a knee airbag is disclosed in Korean Patent Laid-open Publication No. 2003-50611 (hereinafter, referred to as "Conventional Art 1"), entitled "Air Bag System for Knee Protection of Driver," which is shown in FIGS. 1A to 1C.

As shown in FIGS. 1A to 1C, a knee airbag 10 of Conventional Art 1 includes an inflator unit 11 installed inside a lower crash pad 3 to be exploded according to control of an airbag control unit, and an airbag tube 12 deployed from the lower crash pad 3 to a shroud panel 2 by an expansion gas injected upon explosion of the inflator unit 11.

In addition, the knee airbag further includes an airbag cover 14 surrounding the airbag tube 12, fixed to the lower crash pad 3 through the medium of a plurality of fixing members 13, separated from the lower crash pad 3 upon deployment of the airbag tube 12, and avoiding any interference with the airbag tube 12 and peripheral components to prevent damage to the airbag tube 12, and an airbag fixing means 15 for connecting a tip of the airbag tube 12 disposed adjacent to the shroud panel 2 to a predetermined part of the shroud panel 2 and guiding a deployment direction such that the tip of the airbag tube 12 is deployed into the shroud panel 2 upon explosion of the inflator unit 11.

The airbag of Conventional Art 1 protects driver's knees through expansion of the airbag upon occurrence of a vehicle accident.

Further, another example of such a knee airbag is disclosed in Korean Patent Laid-open Publication No. 2005-93843 (hereinafter, referred to as "Conventional Art 2"), entitled "Knee Protection Apparatus for Vehicle Occupant," which is shown in FIGS. 2A to 2C.

As shown in FIGS. 2A to 2C, a knee airbag module 10' of Conventional Art 2 is fixed to an instrument panel reinforcement part 23 through a panel 21 and left/right brackets 22, and to a bottom part 24a of an instrument panel 24 through the panel 21.

The knee airbag 10' includes an airbag 11', an inflator 12' for supplying a gas into the airbag 11' upon a vehicle collision, an airbag case 13' accommodating the airbag 11' and the inflator 12', and an airbag cover 14' covering the airbag case 13'.

Furthermore, the airbag cover 14' is attached to the airbag case 13' and a panel 21 to cover a rear opening 13a of the airbag case 13' and an opening 21a of the panel 21, and a rectangular door part 14a is installed at a position corresponding to the rear opening 13a of the airbag case 13' and the opening 21a of the panel 21.

In addition, a relatively thin binge part 14c is formed at a lower periphery of the door part 14a such that the door part 14a is opened downward upon expansion of the airbag 11'.

SUMMARY

An aspect of the present invention is to provide a knee airbag capable of adjusting the height and width of the airbag upon deployment thereof and deploying the airbag along a lower crash panel.

Another aspect of the present invention is to provide a method of folding a knee airbag capable of preventing contact with an instrument panel upon deployment of the airbag to more rapidly and smoothly expand the airbag.

An aspect of the invention provides a knee airbag installed at a lower crash panel and having an inflator installed at a predetermined position thereof, wherein the knee airbag has at least one wrinkle part folded in a longitudinal direction of side surfaces thereof.

Another aspect of the invention provides a method of folding a knee airbag including a side surface roll-folding step of roll-folding side surfaces of the airbag, and a vertical roll-folding step of roll-folding the airbag from an upside to a downside after the side surface roll-folding step.

BRIEF DESCRIPTION OF THE DRAWINGS

The above and other aspects, features and advantages of the present invention will be more apparent from the following detailed description taken in conjunction with the accompanying drawings, in which:

FIG. 9 is a view showing a side surface roll-folding step in accordance with a fourth exemplary embodiment of the present invention;

FIG. 10 is a view showing a vertical roll-folding step in accordance with a fourth exemplary embodiment of the present invention;

FIG. 11 is a view showing a finishing step in accordance with a fourth exemplary embodiment of the present invention;

FIG. 14 is a view showing a finishing step in accordance with a fifth exemplary embodiment of the present invention.

DETAILED DESCRIPTION

The knee airbag of Conventional Art 1 is deployed in the shroud panel, and driver or passenger knees may collide with the shroud panel and therefore shock absorption of the airbag may be decreased.

The knee airbag of Conventional Art 2 is rapidly expanded upon collision of vehicles, and a brush burn may occur due to friction between the driver's knee and the airbag, and vibrations may occur due to rapid injection of the expansion gas generated from the inflator to make it difficult to smoothly expand the airbag.

Further, a wide deployment width of the conventional airbag may cause a contact with the instrument panel to generate resistance, it is difficult to rapidly deploy and smoothly expand the airbag.

Embodiment 1

A knee airbag in accordance with the present invention has wrinkle parts folded to overlap each other in a longitudinal direction when seen from a side view in an expanded state thereof.

Hereinafter, exemplary embodiments of the present invention will be described with reference to the accompanying drawings.

Figure 1A:
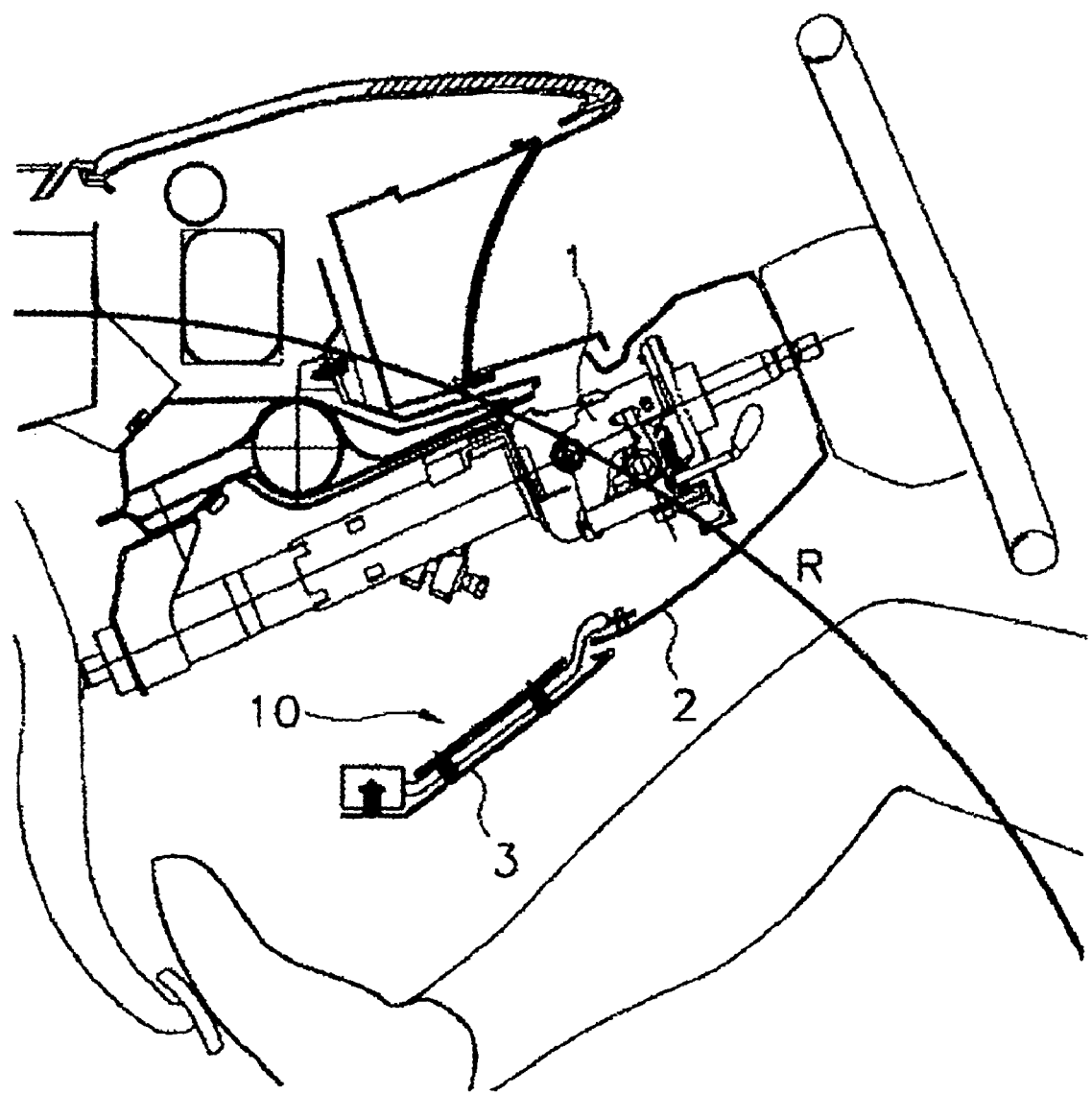
FIGS. 1A to 1C are cross-sectional views of a conventional knee airbag.
Figure 1B:
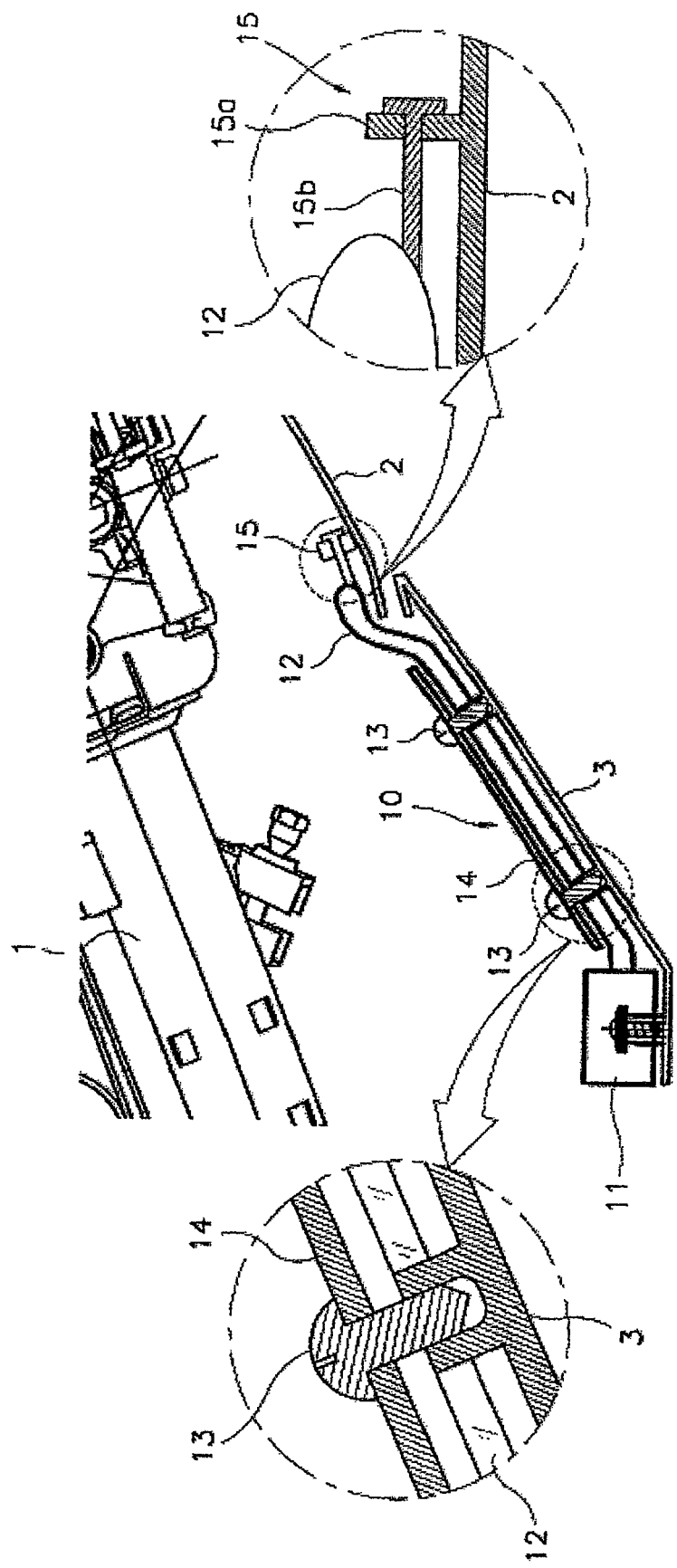
Figure 1C:
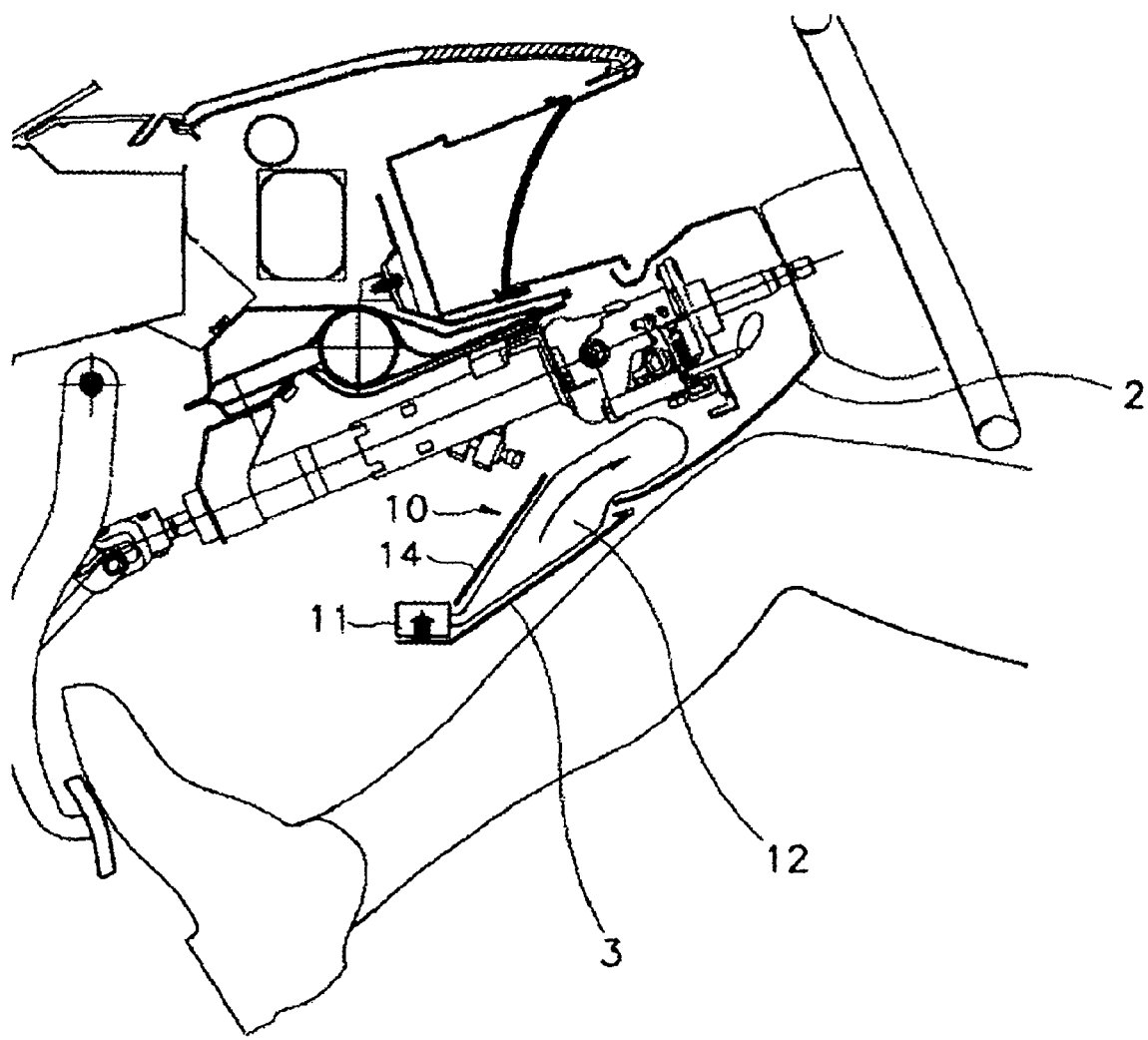
Figure 2A:
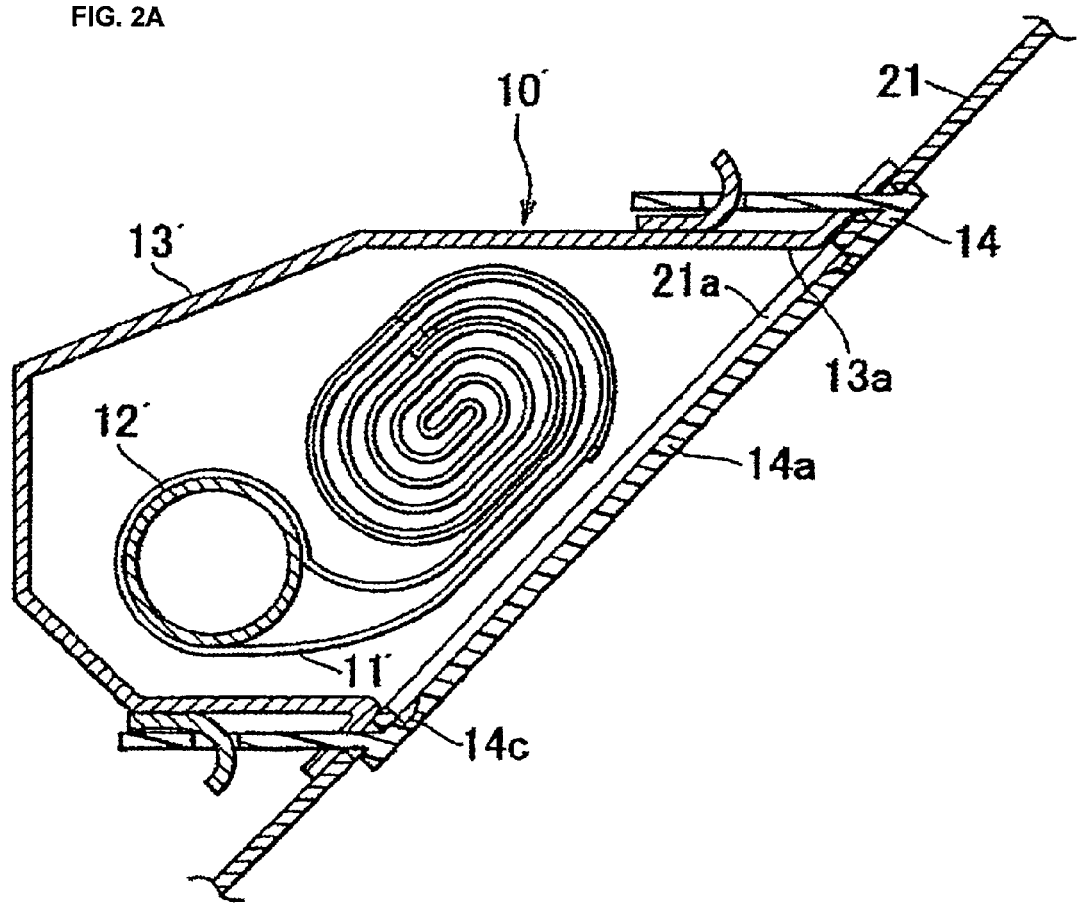
FIGS. 2A to 2C are cross-sectional views of a conventional knee airbag for a passenger.
Figure 2B:
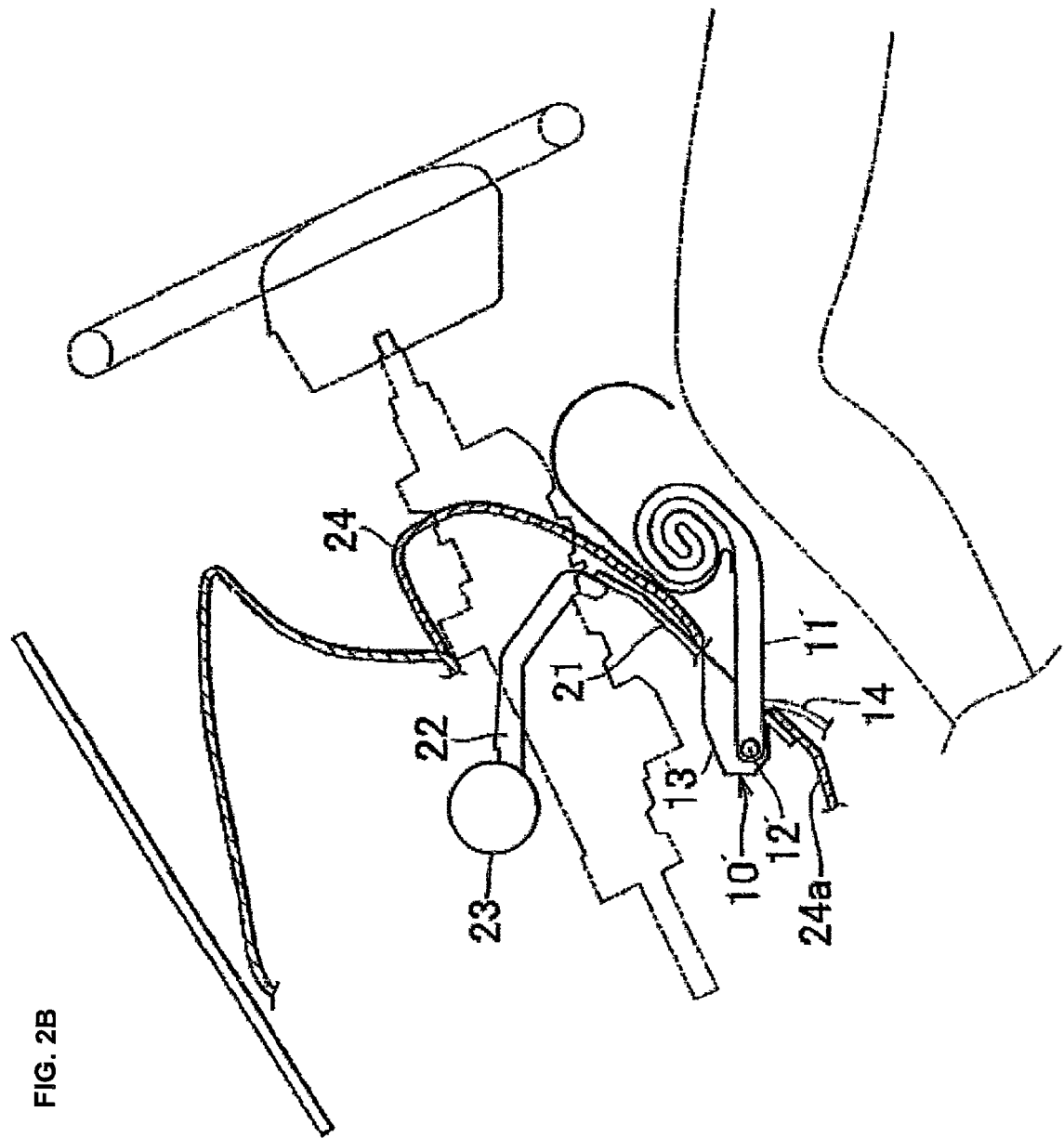
Figure 2C:
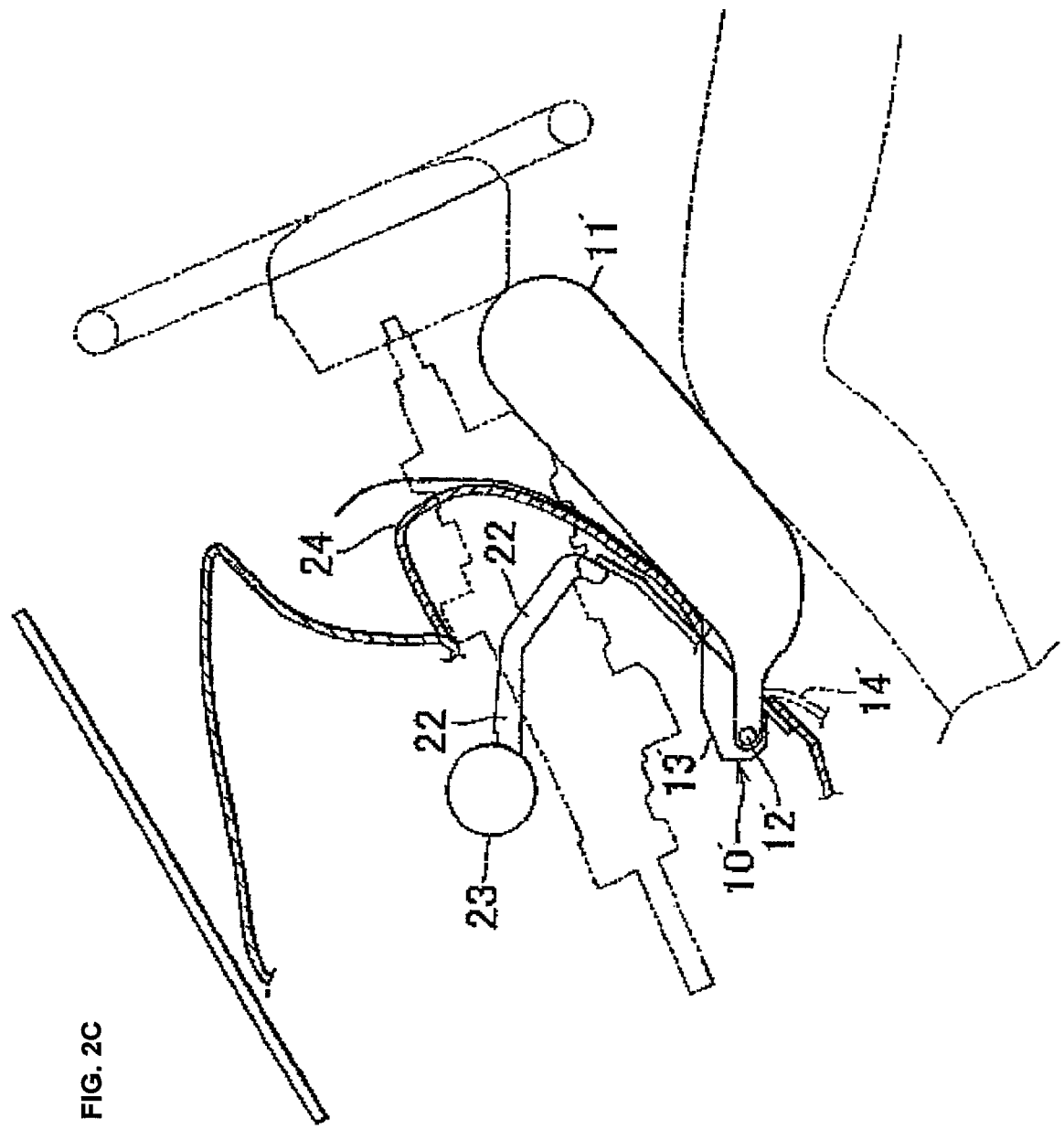
Figure 3:
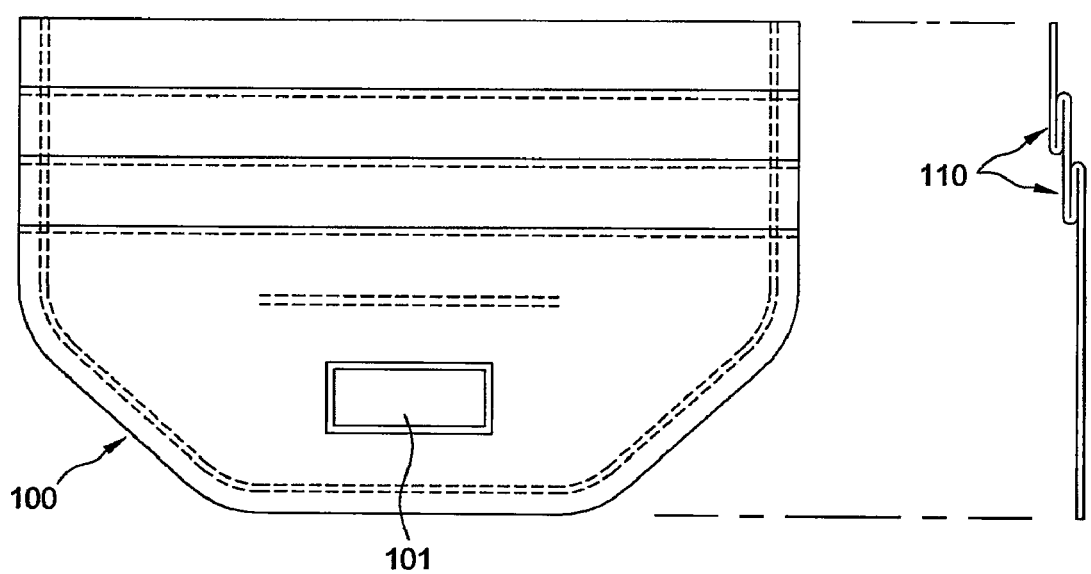
FIG. 3 is a front view and a side view of a knee airbag in accordance with a first exemplary embodiment of the present invention.
Figure 4:
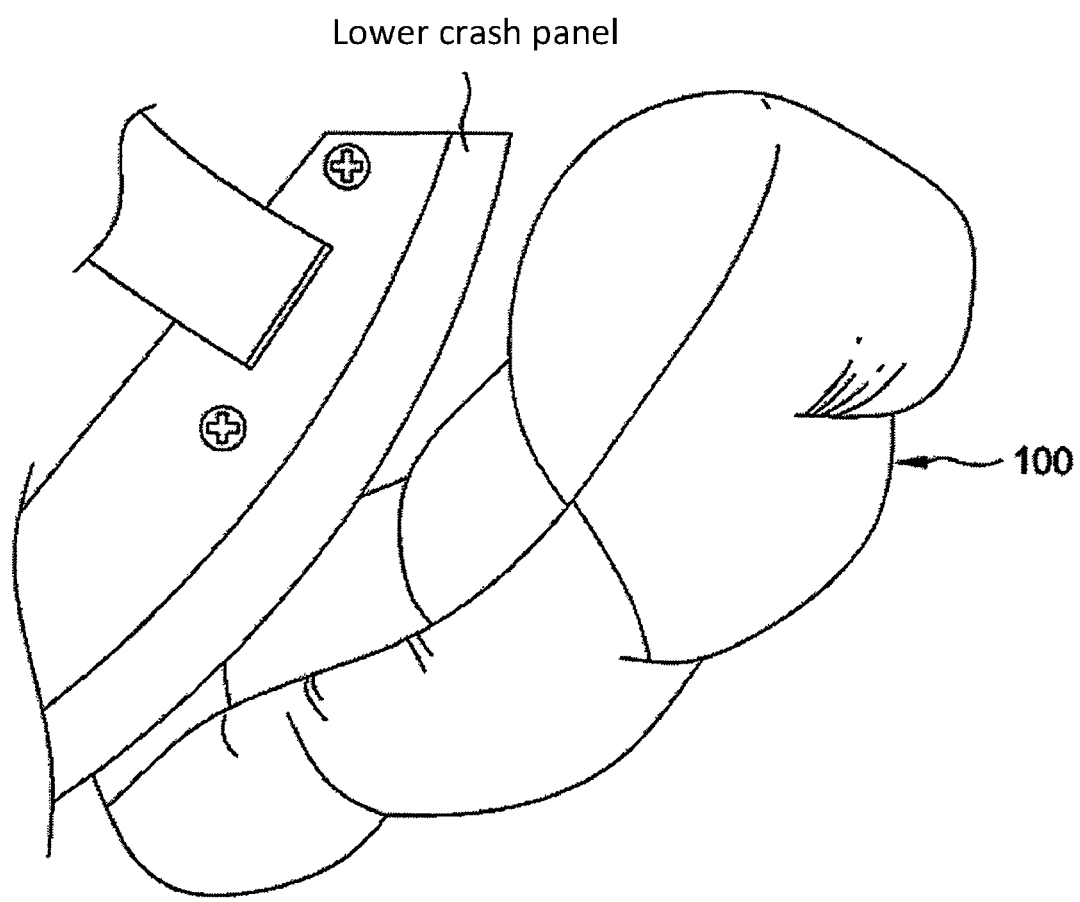
FIG. 4 is a perspective view of an expanded knee airbag in accordance with a first exemplary embodiment of the present invention.
Figure 5:
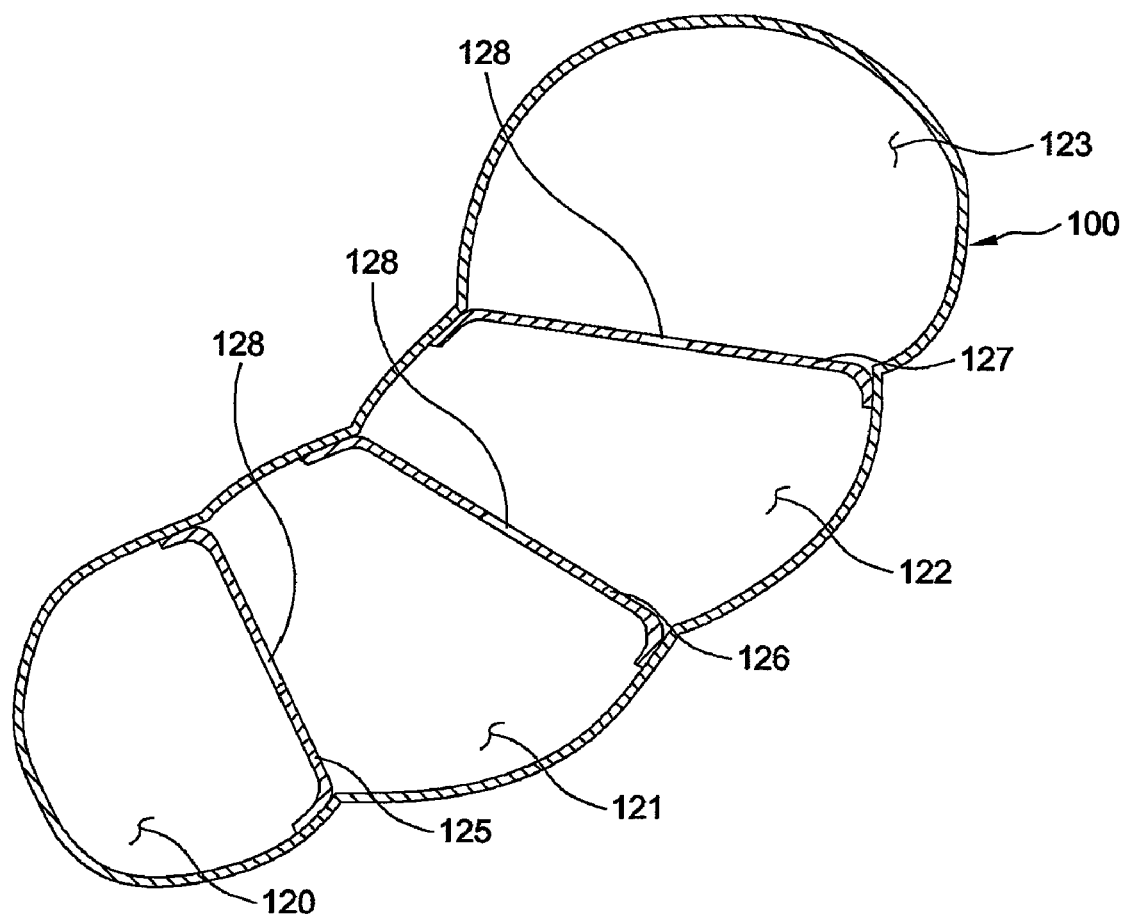
FIG. 5 is a cross-sectional view of FIG. 4.

FIG. 3 is a front view and a side view of a knee airbag in accordance with the present invention, FIG. 4 is a perspective view of an expanded knee airbag in accordance with the present invention, and FIG. 5 is a cross-sectional view of FIG. 4.

As shown in FIGS. 3 to 5, a knee airbag 100 in accordance with the present invention is installed in a lower crash panel (not shown) of a vehicle, and is spread in a substantially pentagonal shape.

The knee airbag 100 can be manufactured by cutting fabrics into the same shapes and sizes and sewing their peripheries, or cutting fabrics into symmetrical patterns and folding the fabrics based on a centerline thereof to sew the fabrics.

At this time, a wrinkle part 110 is formed at an upper part of the knee airbag 100. The wrinkle part 110 is formed by sewing a portion of the knee airbag 100 while the portion is partially folded.

In addition, at least one wrinkle part 110 may be formed at an upper part of the knee airbag 100. In particular, two or three wrinkle parts 110 may be formed to largely expand the knee airbag 100 upon expansion of the knee airbag 100.

Further, as shown in FIG. 5, a first tether 125, a second tether 126, and a third tether 127 are fixed in the knee airbag 100 to divide the knee airbag 100 into chambers 120, 121, 122 and 123. The tethers 125, 126 and 127 are fixed in different angles and lengths. For example, with reference to the second tether 126, the first tether 125 is fixed by an angle lower than that of the second tether 126, and the third tether 127 is fixed by an angle higher than that of the second tether 126.

Furthermore, the first tether 125 has a width smaller than that of the second tether 126, and the third tether 127 has a width larger than that of the second tether 126. The tethers 125, 126 and 127 have holes 128 through which an expansion gas passes.

Unlike this, the first tether 125 may be fixed by an angle lower than and may have a width larger than that of the second tether 126, and the third tether 127 may be fixed by an angle higher than and may have a width smaller than that of the second tether 126.

In addition, an installation hole 101 is formed in a lower part of the knee airbag 100 such that an inflator (not shown) is installed.

In the knee airbag 100 in accordance with the present invention constituted as described above, when a vehicle is side-collided, rolled over, or rapidly stopped, a collision sensor detects the collision and sends a collision signal to an electronic control unit.

Then, the electronic control unit determines expansion of the knee airbag 100 depending on an impact level input from the collision sensor. When the impact level is high, the electronic control unit sends a signal for expanding the knee airbag 100 to the inflator.

At this time, the inflator operates an ignition circuit installed in the inflator according to a control signal from the electronic control unit to perform electrical ignition, and explodes gunpowder therein through the electrical ignition to burn a gas generating agent using heat therefrom.

The expansion gas generated from the inflator is discharged through the installation hole 101. The discharged expansion gas is introduced into the first chamber 120 and then moved into the second chamber 121 through the hole 128 of the first tether 125.

The moved expansion gas expands the second chamber 121, and at the same time, is introduced into the third chamber 122 through the hole 128 of the second tether 126 and moved to the third tether 127.

Then, the expansion gas is moved into the fourth chamber 123 through the hole 128 of the third tether 127 to expand the fourth chamber 123.

As shown in FIG. 5, in the knee airbag 100 expanded as described above, since the first tether 125 is fixed by the smallest angle and has the smallest width, in comparison with the second tether 126 and the third tether 127, the first chamber 120 is expanded by the smallest size.

In addition, since the second chamber 121 is defined by the first tether 125 and the second tether 126, the second chamber 121 is expanded more than the first chamber 120. Further, since the third chamber 122 is defined by the second tether 126 and the third tether 127, the third chamber 122 is expanded more than the second chamber 121.

Furthermore, the fourth chamber 123 is expanded more than the first chamber 120 to the third chamber 122.

The chambers 120, 121, 122 and 123 are expanded on different size in a curved shape along the curved lower crash panel, and as a result that the size of the chambers 120, 121, 122 and 123 are increased from a downside to upside, the chambers protect not only passenger's knees but also passenger's ankles from impact.

In addition, at least one wrinkle part 110 is formed at the upper part of the knee airbag 100 such that the upper part is expanded by the introduced expansion gas more than a lower part thereof. That is, a periphery of the knee airbag 100 is limitedly expanded by a seamed part, while a center part of the knee airbag 100 is expanded toward the passenger more than the periphery.

Since the center part of the knee airbag in contact with the passenger's knees is expanded more than the periphery, it is possible to more safely protect the passenger.

Embodiment 2

Figure 6:
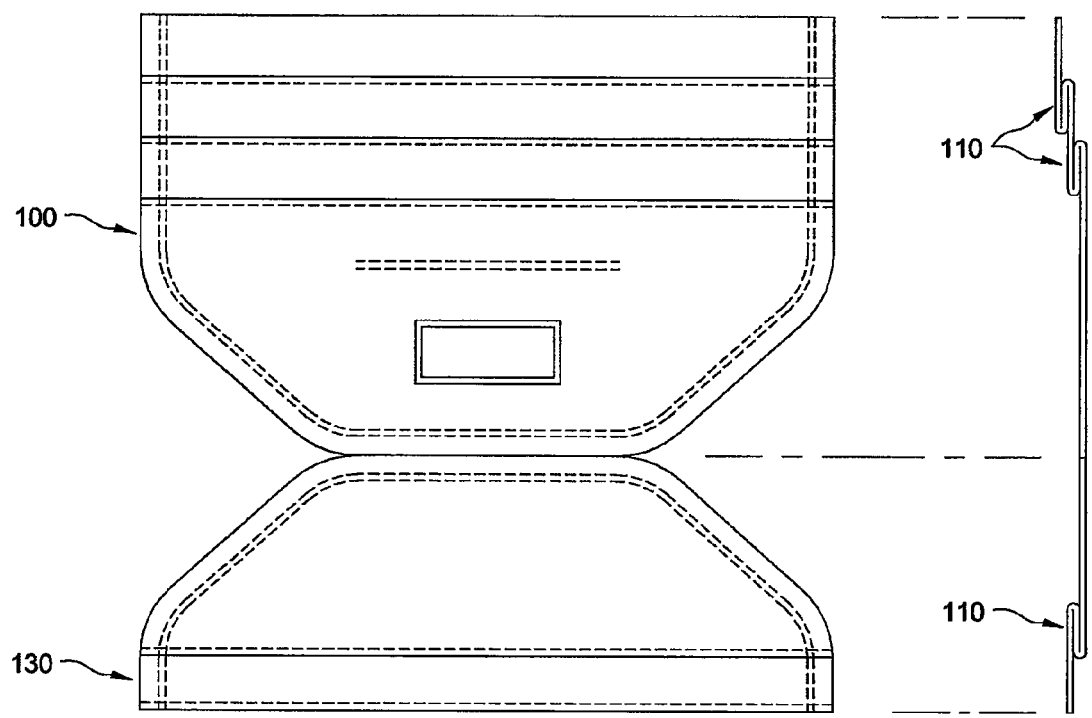
FIG. 6 is a front view and a side view of a knee airbag in accordance with a second exemplary embodiment of the present invention.
Figure 7:
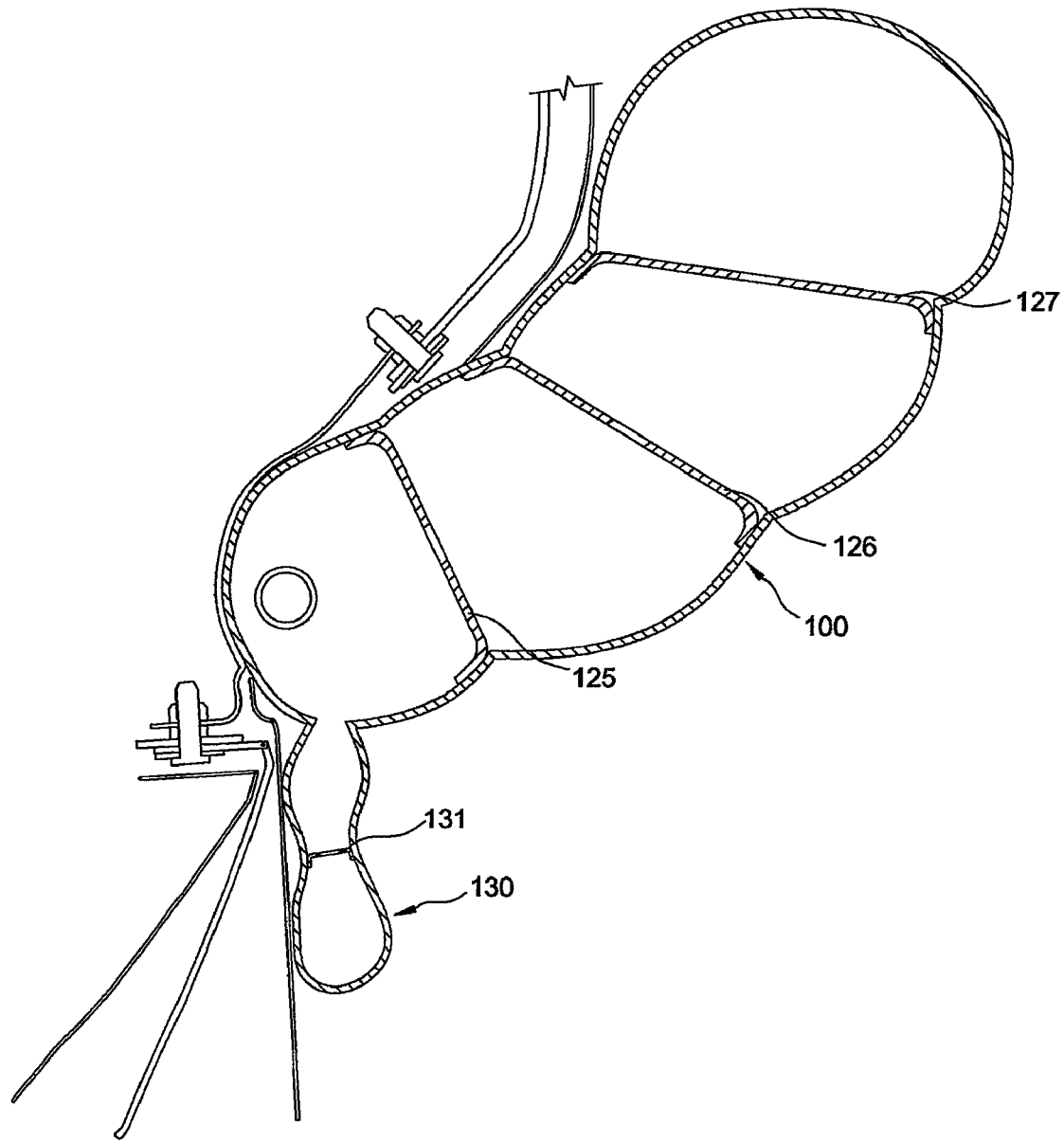
FIG. 7 is a cross-sectional view of FIG. 6.

Embodiment 2 is shown in FIGS. 6 and 7. Descriptions of the same parts as Embodiment 1 will not be repeated. Like reference numerals designate like components throughout Embodiment 2.

FIG. 6 is a front view and a side view of Embodiment 2 in accordance with the present invention, and FIG. 7 is a cross-sectional view of Embodiment 2 in accordance with the present invention.

As shown in FIGS. 6 and 7, a knee airbag of Embodiment 2 in accordance with the present invention further includes an extension airbag 130 extending downward from a lower part thereof.

Similar to Embodiment 1, the extension airbag 130 may have a wrinkle part 110 formed at its lower part, and may have at least one tether 131 fixed therein.

In addition, the tether 131 has a hole (not shown) through which an expansion gas passes. Of course, at least one tether 131 may be fixed in different angles and lengths.

In the knee airbag 100 of the present invention constituted as described above, the expansion gas discharged from the inflator is moved upward to expand the knee airbag 100, and then divisionally moved downward to expand the extension airbag 130 at once.

While the knee airbag 100 having the extension airbag 130 is expanded by divisional supply of the expansion gas from the inflator, since expansion of the knee airbag 100 is similar to Embodiment 1, its description will not be repeated.

Embodiment 3

Figure 8:
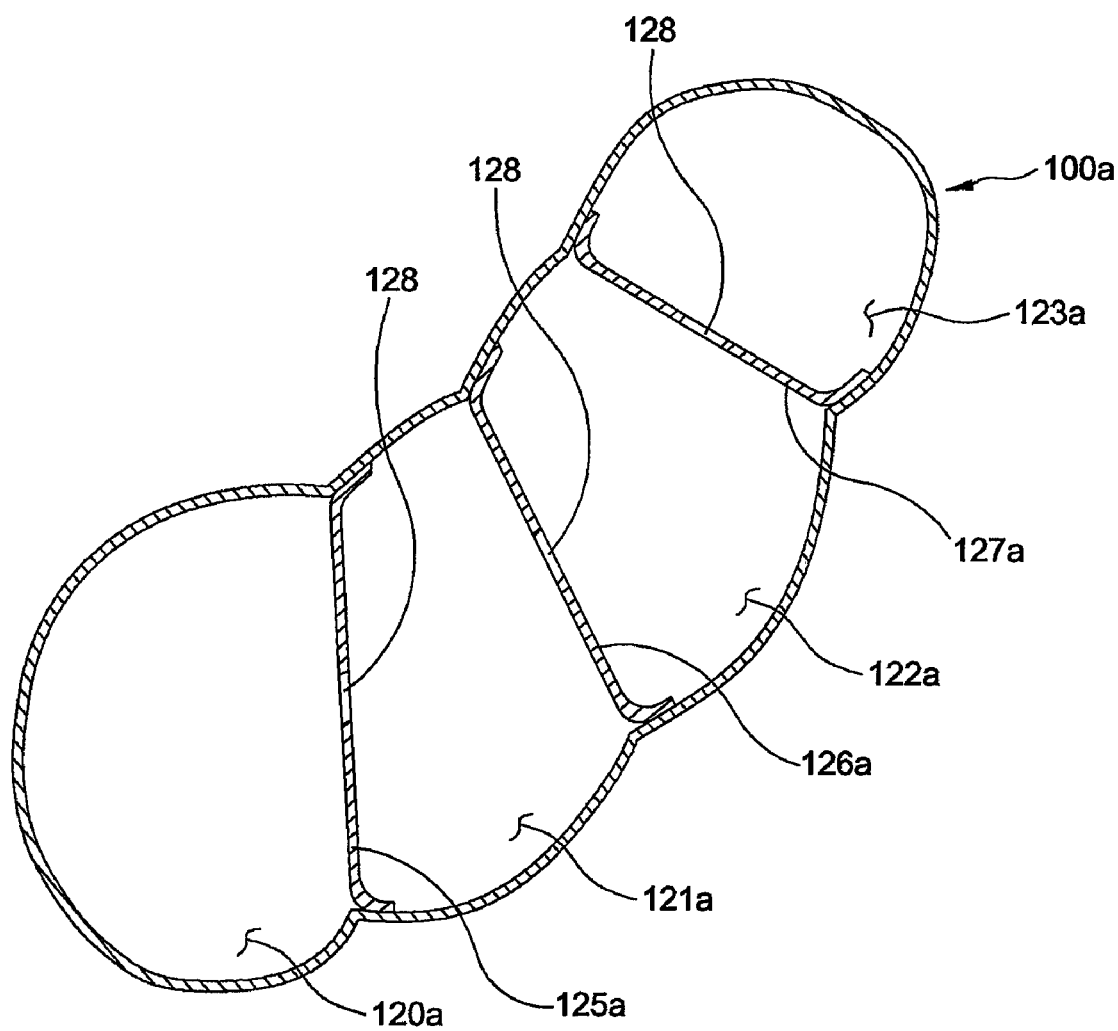
FIG. 8 is a cross-sectional view of a knee airbag in accordance with a third exemplary embodiment of the present invention.

FIG. 8 is a cross-sectional view of Embodiment 3 in accordance with the present invention.

As shown in FIG. 8, Embodiment 3 in accordance with the present invention may be applied to a knee airbag 100a having a shape that the knee airbag 100 of Embodiment 1 is turned upside down.

The knee airbag 100a includes a first chamber 120a, a second chamber 121a, a third chamber 122a, and a fourth chamber 123a. The first chamber 120a has the largest size, and the second chamber 121a, the third chamber 122a and the fourth chamber have sizes, which are sequentially reduced.

In addition, a first tether 125a, a second tether 126a, and a third tether 127a are formed between the chambers 120a, 121a, 122a and 123a, and have holes 128 through which an expansion gas passes.

Further, the first tether 125a is fixed by an angle lower than and may have a width larger than that of the second tether 126a, and the third tether 127a is fixed by an angle higher than and may have a width smaller than that of the second tether 126a.

Furthermore, the knee airbag 100a may also selectively have an extension airbag 130 similar to Embodiment 2.

Since the knee airbag in accordance with Embodiment 3 is similar to Embodiment 1, the same descriptions as Embodiments 1 and 2 will not be repeated. Different from Embodiment 1, the knee airbag 100a is expanded such that a lower part of the airbag 100a is wide and an upper part thereof is narrow.

The knee airbag 100a can more safely protect driver's ankles or passenger's ankles upon occurrence of accidents.

Embodiment 4

FIG. 9 is a view showing side surface roll-folding steps of Embodiment 4 in accordance with the present invention, FIG. 10 is a view showing vertical roll-folding steps of Embodiment 4 in accordance with the present invention, and FIG. 11 is a view showing finishing steps of Embodiment 4 in accordance with the present invention.

In addition, an airbag in accordance with the present invention will be described with respect to a knee airbag for protecting a passenger seated on a passenger seat, but may not be limited thereto.

The airbag of Embodiment 4 in accordance with the present invention is folded in a sequence shown in FIGS. 9 to 11, which respectively shows that the method of folding the airbag includes the sub-processes of a side surface roll-folding process S1, a vertical roll-folding process S2, and a finishing process S3.

First, in the side surface roll-folding process S1, after positioning a connection part 160 connected to an inflator (not shown) downwardly (Step 1), one side of the airbag 150 (the left side in the figure) is folded by a certain width to form a folded edge that is generally parallel to a centerline of the airbag 150 (Step 2). Then, one more folding of the airbag 150 on the same side, in an initial folding direction, is performed to form another fold that is also generally parallel to the centerline (Step 3). The same side of the airbag 150 is then folded to form an acute angle with respect to a centerline thereof (Step 4).

Next, the other side of the airbag 150 is folded such that an initially folded width is larger than the initial folding width of the previous side (Step 5). Next, this side of the airbag is folded to form an acute angle with respect to the centerline such that the acute angle of the previously folded side is smaller than that of the current side (Step 6).

Next, in the vertical roll-folding process S2, the airbag 150 is folded from the end opposite of the connection part 160 toward the connection part 160. This is illustrated as being done in five folds, with the last fold not overlapping the connection part 160. At this time, since the side surface roll-folding is performed to form certain angles, seamed parts of the airbag 150 do not overlap each other.

Further, in the finishing process S3, after completion of the vertical roll-folding process S2, the airbag 150 is reversed or turned over (Step 12) and then folded in an opposite direction of the prior folded direction, in other words, backwardly upon itself once (Step 13) and then again. As a result the connection part 160 is surrounded on the folded part. The ends of the connection part 160 are next folded around the lateral sides of the folded airbag 150 and secured to itself (Step 14).

Embodiment 5

Figure 12:
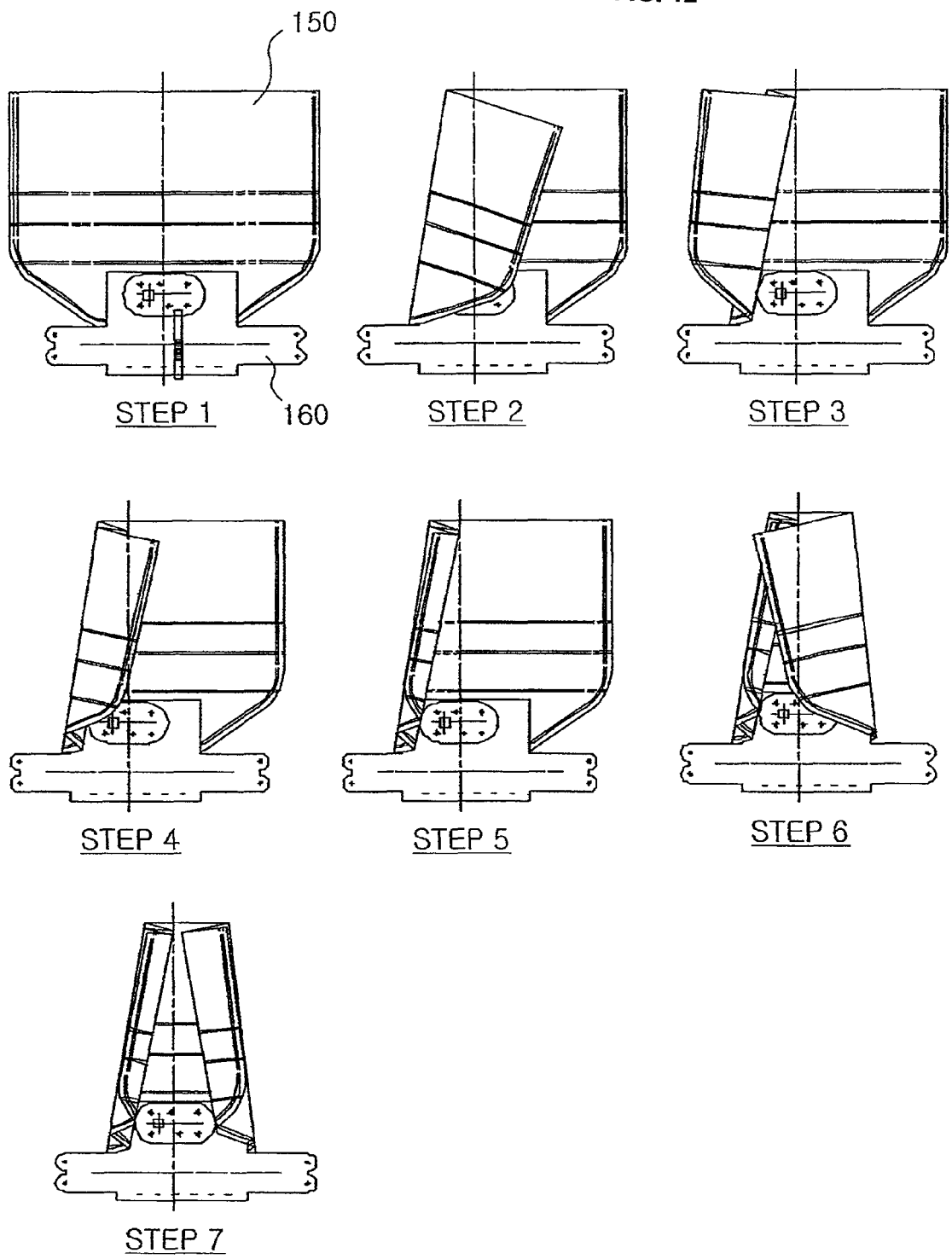
FIG. 12 is a view showing a side surface roll-folding step in accordance with a fifth exemplary embodiment of the present invention.
Figure 13:
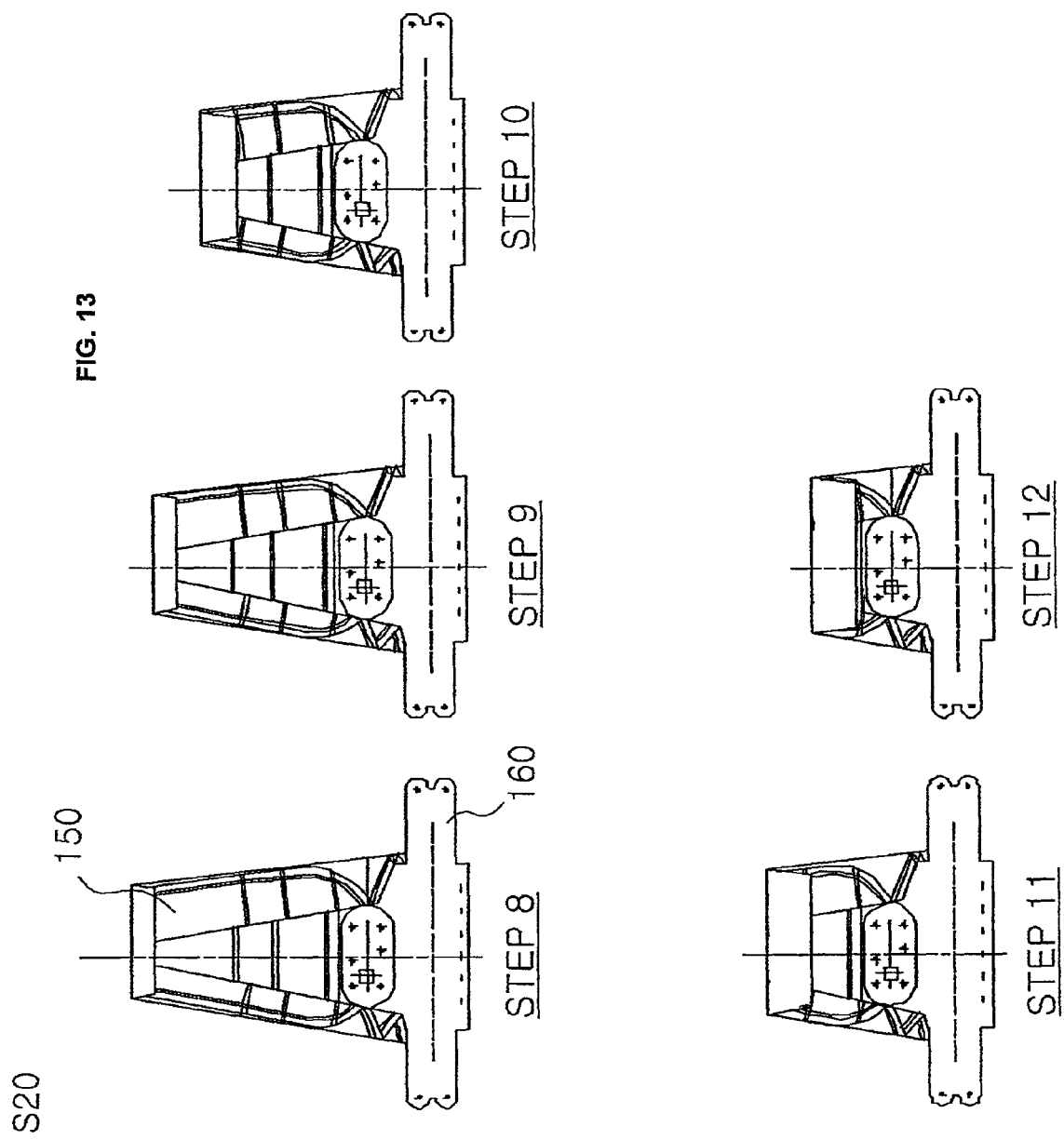
FIG. 13 is a view showing a vertical roll-folding step in accordance with a fifth exemplary embodiment of the present invention.

Hereinafter in Embodiment 5, the folding sequence of an airbag in accordance with the present invention will be described and is shown in FIGS. 12 to 14. First, in a side surface roll-folding process S10, after locating a connection part 160 connected to an inflator (not shown) in a downward position, as represented in the figures, one side of the airbag 150 (the left side in FIG. 12) is folded toward a centerline of the airbag 150. At this time, the folded line has an acute angle with respect to centerline thereof and an end of the folded one side goes or extends over the centerline.

Next, this folded end of the one side is folded outward in an opposite direction, back upon itself, such that the newly created folded line does not go or extend over the centerline. Then, the remaining part of the one side is sequentially and alternately folded toward the centerline and back upon itself in an amount that corresponds to the originally folded width of this step.

Next, an end of the other side of the airbag 150 (the right side in the figures) is folded toward and over the centerline, then back upon itself so as to not extend over the centerline. At this time, the angle relative to the centerline, as defined by the first fold of this side (the right side), is smaller than the angle defined by the first fold of the one side (the left side), and a width of the other side (the right side) is larger than that of the one side (the left side).

Next, in the vertical roll-folding process S20, the airbag 150 is folded toward the connection part 160, five times as seen in FIG. 13, but no over the connection part 160. Since the side surface roll-folding is performed to form certain angles, similar to Embodiment 4, seamed parts of the airbag 150 do not overlap each other.

In addition, in the finishing process S30, similar to Embodiment 4, after completion of the vertical roll-folding, the airbag 150 is reversed or turned over (Step 13) and then folded in an opposite direction of the previously folded direction (back upon itself) (Step 14) and over the connection part 160, and then the connection part 160 is folded such that the folded part is surrounded by the connection part 160 (Step 15).

As can be seen from the foregoing, since an upper part of a knee airbag in accordance with the present invention is expanded more than a lower part thereof, it is possible to more safely protect passenger's knees. In addition, since the knee airbag is expanded upward and downward, it is also possible to protect passenger's ankles and readily adjust the height and width of the knee airbag. Further, the knee airbag is expanded to correspond to an appearance of a lower crash, thereby more safely protecting the passenger.

Furthermore, the airbag in accordance with the present invention is prevented from collision with an instrument panel to enable sequential and rapid deployment.

In addition, because a side surface roll-folding step is performed to form a certain inclination, it is possible to prevent seamed parts from being bulged due to overlapping of the seamed parts after folding the airbag.

Therefore, the airbag in accordance with the present invention is installed at a lower crash panel in front of a driver's seat and a passenger's seat to protect the driver and passenger's ankles as well as the driver and passenger's knees.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

The invention claimed is:

1. A method of folding a knee airbag assembly having a connection part and an airbag, the airbag defining a centerline, opposing side surfaces and an end located opposite the connection part, and having a front panel facing an occupant and a rear panel facing the front panel, the front panel having at least one folded over and sewn portion defining a wrinkle part adjacent one of the side surfaces and oriented in a vertical direction, the method comprising the steps of:

roll-folding one of the side surfaces toward the centerline;
roll-folding the other of the side surfaces toward the centerline;
after the steps of roll-folding both of the side surfaces, vertical roll-folding of the airbag from the end and toward the connection part to form a folded knee airbag assembly; and
wherein, in the steps of roll-folding the side surfaces, the side surfaces are roll-folded at an inclination angle such that both ends formed by the roll-folding of the side surfaces are inclined with respect to the centerline thereby preventing the sewn portion and the wrinkle part from being rolled up upon themselves during the vertical roll-folding step.

2. The method according to claim 1, wherein the inclination angles of roll-folded side surfaces are different from one another.

3. The method according to claim 1, wherein, in the step of roll-folding the side surfaces, both of the side surfaces of the airbag are roll-folded at different inclination angles with respect to the centerline.

4. The method according to claim 1, wherein the step of roll-folding the side surfaces includes folding the side surfaces back upon themselves.

5. The method according to claim 1, wherein the step of vertical roll-folding includes creating multiple folds in a first direction and then folding of the airbag back upon itself.

6. The method according to claim 1, further comprising the step of partially folding both of the side surfaces over themselves and sewing together to form the wrinkled part.

* * * * *